(12) United States Patent
McBurney et al.

(10) Patent No.: US 6,437,734 B1
(45) Date of Patent: Aug. 20, 2002

(54) SATELLITE NAVIGATION RECEIVER AND METHOD

(75) Inventors: Paul W. McBurney, San Francisco; Arthur N. Woo, Cupertino, both of CA (US)

(73) Assignees: Seiko Epson Corporation, Tokyo (JP); Eride, Inc., San Francisco, CA (US)

( * ) Notice: Subject to any disclaimer, the term of this patent is extended or adjusted under 35 U.S.C. 154(b) by 0 days.

(21) Appl. No.: 09/687,044

(22) Filed: Oct. 11, 2000

(51) Int. Cl.⁷ .................................................. G01S 5/04
(52) U.S. Cl. .............................. 342/357.09; 342/357.03
(58) Field of Search ......................... 342/357.09, 357.1, 342/357.15, 357.03

(56) References Cited

U.S. PATENT DOCUMENTS

| | | | |
|---|---|---|---|
| 5,781,156 A | 7/1998 | Krasner | 342/357 |
| 5,812,087 A | 9/1998 | Krasner | 342/357 |
| 5,825,327 A | 10/1998 | Krasner | 342/357 |
| 5,831,574 A | 11/1998 | Krasner | 342/357 |
| 5,841,396 A | 11/1998 | Krasner | 342/357 |
| 5,874,914 A | 2/1999 | Krasner | 342/357 |
| 5,884,214 A | 3/1999 | Krasner | 701/207 |
| 5,945,944 A | 8/1999 | Krasner | 342/357.06 |
| 5,999,124 A | 12/1999 | Sheynblat | 342/357.09 |
| 6,002,363 A | 12/1999 | Krasner | 342/357.1 |
| 6,016,119 A | 1/2000 | Krasner | 342/357.06 |
| 6,052,081 A | 4/2000 | Krasner | 342/357.02 |
| 6,061,018 A | 5/2000 | Sheynblat | 342/357.06 |
| 6,064,336 A | 5/2000 | Krasner | 342/357.05 |
| 6,078,290 A | 6/2000 | McBurney et al. | 342/417 |
| 6,118,977 A * | 9/2000 | Vannucci | 455/12.1 |
| 6,204,808 B1 * | 3/2001 | Bloebaum et al. | 342/357.07 |
| 6,211,819 B1 * | 4/2001 | King et al. | 342/357.09 |
| 6,229,478 B1 * | 5/2001 | Biacs et al. | 342/357.03 |

FOREIGN PATENT DOCUMENTS

GB 2 347 035 * 8/2000 ............. G01S/5/14

OTHER PUBLICATIONS

Analog Devices Global Positioning Systems Solutions NAV2K Chipset, (http://www.analog.com/techsupt/prod_briefs/nav2k_chipset.html).*

* cited by examiner

Primary Examiner—Gregory C. Issing (57) ABSTRACT

A satellite-navigation system comprises an observer platform for collecting signal observations from orbiting navigation satellites. A server platform provides a simplified navigation-satellite constellation almanac, ephemeris, differential correction, and client services. A navigation platform passes information between the observer and server platforms and provides for autonomous position solution computations for a limited time after a periodic call for an aiding data from the server platform. A measurement platform included in the server platform makes static observations of a navigation-satellite constellation and that builds a database of measurement errors and satellite data messages. A health and quality monitor included in the server platform checks the static observations and preventing an inclusion of incorrect information in the database of measurement errors and satellite data messages. A TCP/IP communication link existing at least once between the server and navigation platforms supports an information datapacket format that periodically transfers over the communication link. It reduces the almanac and ephemeris satellite messages at the server platform to a set of simple polynomials that represent a recent satellite position and velocity. These are useful at the navigation platform to compute a current position solution with real-time data from the observation platform. An aiding data with light-weight models is provided by the server platform to the observer platform to eliminate all data storage of almanac and ephemeris, and to permit only fixed-point integer arithmetic to be used to solve for user position at the navigation platform.

8 Claims, 4 Drawing Sheets

SATELLITE NAVIGATION RECEIVER AND METHOD

FIELD OF THE INVENTION

The present invention relates to satellite-navigation receivers and systems, and more particularly to devices and methods for operation in very-low signal-strength areas, and those that can initialize and output position solutions very quickly.

DESCRIPTION OF THE PRIOR ART

Global positioning system (GPS) receivers use signals received from typically three or more earth-orbiting satellites to determine navigational data such as position and velocity. GPS signals are available worldwide at no cost and are now being routinely used to determine the location of automobiles to within one city block, or better. Dual-frequency carrier GPS receivers typically track a pair of radio carriers, L1 and L2, associated with the GPS satellites to generate accumulated delta-range measurements (ADR) from P-code modulation on those carrier frequencies and at the same time track L1 C/A-code to generate code phase measurements. Carrier frequency L1 is allocated to 1575.42 MHz and carrier frequency L2 is positioned at 1227.78 MHz. Less expensive receivers tune only one carrier frequency, and therefore do not have adequate information to compute the local troposheric and ionospheric signal-propagation delays that appear as position errors. At such frequencies, radio carrier signals travel by line-of-sight. Thus buildings, mountains and the horizon can block reception, and multipath reflections can interfere with good reception.

Each one of the constellation of GPS satellites in orbit about the earth transmits one of thirty-two unique identifying codes in a code-division multiple access (CDMA) arrangement. This allows all of the many GPS satellites to transmit in spread spectrum mode at the same frequency, plus or minus a Doppler frequency shift of that frequency as results from the satellite's relative velocity. Particular satellites are sorted out of a resulting jumble of signals and noise by correlating a 1023 "chip" code to one of the thirty-two pseudo random number (PRN) sequence codes that are preassigned to individual GPS satellites. These codes are not necessarily being transmitted in phase with one another. Therefore, "finding" a GPS satellite initially involves searching various carrier frequencies, to account for Doppler frequency shift and oscillator inaccuracies, and searching for a code match, using 1023 different code phases and twenty or more possible correlation code templates.

In large cities with many tall buildings, one or more of the GPS satellites being tracked by a particular receiver, may be temporarily blocked. In some situations, such blockage can prevent all the overhead GPS satellites from being tracked and such outages can last for several minutes. GPS signals also become unavailable to vehicles moving through underground or underwater tunnels.

At least one conventional GPS five-channel receiver directs all of its channels to focus on one satellite at initial turn-on. This addresses the problem of satellite signal frequency uncertainty that exists due to Doppler effects and local oscillator inaccuracies in the receiver. A search for a particular satellite in the apparent-Doppler frequency spectrum is conducted in parallel. For example, by segmenting the possible Doppler frequency spectrum into as many segments as there are receiver channels. Then appointing each of the several receiver channels to attend to a search within a respective segment.

The single largest uncertainty stems from the random frequencies possible from typical local oscillators at start-up. Therefore, the apparent-Doppler frequency is known only within wide search boundaries. Knowing the actual Doppler frequency is not much help, because the local oscillator can be so far off nominal on its own.

From the user's standpoint, at least two operational characteristics of prior art GPS receivers interfere with complete satisfaction. Such conventional receivers often quit working indoors because the buildings reduce the local signal field level to less than the receiver's maximum sensitivity. And, most receivers take a very long time to produce a position solution from a cold start.

Intensive calculations in GPS receivers have necessitated high clock speeds and lots of expensive storage memory. These, in turn, demand expensive and comprehensive hardware. Manufacturers and users alike would appreciate lighter and thinner navigation solutions that could use inexpensive platforms or share pre-existing platforms for other applications.

The Internet also represents a way for individual GPS receivers to monitor differential correction data in their areas and to off-load calculation-intensive tasks on regional web-servers that have high performance processors.

SnapTrack, Inc., (San Jose, Calif.) is a commercial supplier of wireless assisted GPS (WAG) systems. Time, frequency, and approximate location data are extracted from a wireless network to assist GPS-signal processing in a navigation receiver. Such technology is described in a number of United States Patents assigned to SnapTrack, including: U.S. Pat. Nos. 5,945,944; 5,663,734; 5,781,156; 5,825,327; 5,831,574; 5,841,396; 5,812,087; 5,874,914; 5,884,214; etc. Also see, U.S. Pat. No. 6,078,290.

SUMMARY OF THE INVENTION

It is therefore an object of the present invention to provide a satellite-navigation receiver that can work indoors with extremely low signal strength levels.

It is another object of the present invention to provide a satellite-navigation receiver that produces position solutions rapidly after each cold start.

It is a further object of the present invention to provide a satellite-navigation system that is inexpensive.

It is a still further object of the present invention to provide a satellite-navigation system that interfaces with the Internet.

It is an object of the present invention to provide a system that can be assisted in improved accuracy and performance via time-difference and frequency-difference information distributed in a network.

Briefly, a GPS-positioning system embodiment of the present invention comprises a system-on-chip receiver, a network-client and a webserver. The webserver can support simple-observer platform mode where the system-on-chip receiver merely passes through information, or it can support a half-autonomous mode where the system-on-chip receiver is able to compute its position as long as fifteen minutes after its last contact with the webserver. The webserver includes its own local GPS-constellation measurement platforms to build a database of GPS-measurement errors, ephemeris, almanac, and other satellite-data messages. Information from poor-performing satellites with problems is filtered out. The network client is relieved of traditional computation-intensive tasks by using integer arithmetic and communicating binary numbers rather than floating-point or using transcendental math functions. In one mode, position fixes are provided by the webserver from data passed from the network client. The system-on-chip receiver includes circuits to boost receiver sensitivity and search speed.

An advantage of the present invention is that a system and method are provided that reduce the costs of user navigation equipment.

Another advantage of the present invention is that a system and method are provided that improve sensitivity and time-to-first-fix enough for urban canyon and indoor use.

A further advantage of the present invention is that a system and method are provided that makes higher level database services to be offered on the Internet which are related to real-time and historical user position fixes.

These and other objects and advantages of the present invention will no doubt become obvious to those of ordinary skill in the art after having read the following detailed description of the preferred embodiments which are illustrated in the various drawing figures.

DETAILED DESCRIPTION OF THE PREFERRED EMBODIMENT

Figure 1:
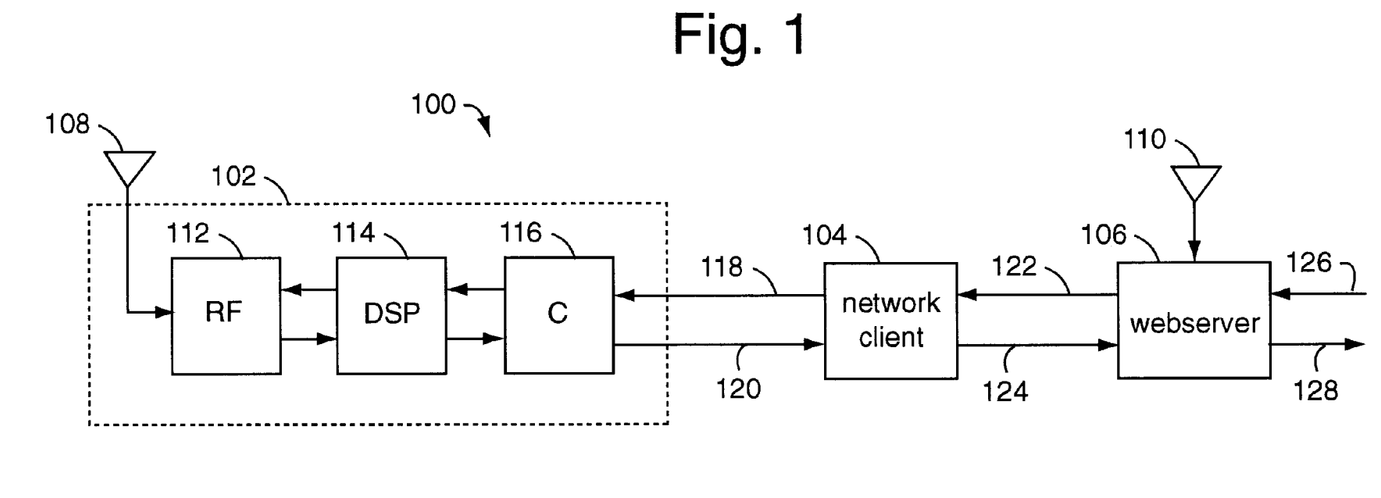
FIG. 1 is a functional block diagram of a user navigation system embodiment of the present invention distributed between a user appliance, a network client, and a webserver.

A position-determining system embodiment of the present invention is illustrated in FIG. 1, and is referred to herein by the general reference numeral 100. System 100 comprises a receiver 102, a network client 104 collocated with the receivers and a webserver 106 remote from the receiver and client. A microwave antenna 108 receives signals local to the receiver 102 transmitted from orbiting GPS satellites. A second microwave antenna 110 receives signals local to the webserver 106 transmitted from some of the same orbiting GPS satellites.

Although the receiver 102 is remote from the webserver 106, it is in the same general geographic area and can still benefit from differential, ionosphere, and tropospheric corrections computed by the webserver 106.

The receiver 102 comprises a radio frequency (RF) stage 112, a digital signal processor (DSP) 114, and a microcomputer ($\mu$C) 116. The $\mu$C 116 includes a random-access memory (RAM), a read-only memory (ROM), and a microprocessor responsive to high-level commands from the client 104. Such RAM and ROM are unusually small in size to reduce manufacturing and operational costs. Therefore it is critical to embodiments of the present invention that nothing in the receiver 102 is used to store satellite ephemeris or almanac data. In at least one mode of operation, the receiver 102 critically depends on periodic updates from the webserver 106 of a set of polynomials that each represent visible-satellite position and velocity.

In one embodiment of the present invention, the DSP 114 is preferably implemented as a dedicated logic-gate construction of a state machine, e.g., as an application specific integrated circuit (ASIC) or with a gate array. The $\mu$C 116 is programmed to implement a second state machine using firmware or software, e.g., a software-implemented state machine. These two state machines work in a symbiotic relationship to convert the in-phase and quadrature samples provided by the RF stage 112 into navigation measurements that are constructed and forwarded by the $\mu$C 116. Serial communications links 118 and 120 carry these measurements to a navigation platform, e.g., either the client 104 or through it to the webserver 106. Such navigation platform communicates back the satellites to search, the measurements to be taken, etc.

Communications links 122 and 124 between the client 104 and the webserver 106 preferably include the Internet and use transfer control protocol/Internet protocol (TCP/IP) technology. Third-party users preferably have access to at least the webserver 106.

Parts or all of communication links 118, 120, 122, and 124, may be wireless. Particular applications may depend on or be enabled by these links being wireless. This would be especially true if the receiver 102 was battery operated and worn or carried by a user or vehicle.

It is critical to all embodiments of the present invention that no floating point arithmetic or base-10 calculations be carried on by the receiver 102. Single-precision, and certainly double-precision, floating-point are too processor intensive for the low power consumption and slow clock speeds that are preferably an inseparable part of receiver 102. Instead, all calculations and solutions of receiver position are required to be done in integer base-2 arithmetic, e.g., 32-bit binary. This necessitates in at least one mode of operation that the webserver 106 compute and pass on troposheric, ionospheric, selective availability (SA), and differential correction data formatted as base-2 integers. When this is not possible, these chores fall on the client 104.

GPS-navigation almanac and ephemeris are acquired and reduced by the webserver 106 with its own reference-station GPS-receiver to supply simple polynomials that respectively represent each satellite's position and velocity. Such polynomials will, of course, go stale over time, but periodic contact between the client 104 and 106 via the Internet are critically depended upon to provide fresh-enough orbit data. The receiver 102 is therefore relieved of the storage-intensive requirement to hold current ephemeris and almanac data in local RAM/ROM, and relieved of the RISC processor 258-intensive job of locally computing in double-precision floating-point math the satellite-orbit positions for every position fix.

In a business-model embodiment of the present invention, the webserver 106 is owned and operated by an independent service provider. Per-use or subscription fees are charged to users who operate the receiver 102 and/or network-client 104. The receiver 102 is alternatively further bundled in an intellectual property (IP) package for semiconductor integrated circuit device designs of application-specific network clients 104. Such IP is sold for a license fee and hardware-device cost to original equipment manufacturers (OEM's) of network clients 104.

The RF stage 112 and the DSP 114 constitute a "hardware enabler" that can be commercially sold as Verilog-code in a bundle with software for the $\mu$C to an original equipment manufacturer (OEM) to incorporate in their products. Such hardware enabler is preferably implemented in a single integrated circuit (IC) device as a system-on-chip (SOC). Other forms of hardware description language (HDL) and software programming code like C++, Visual-BASIC, etc., can also be used.

The client 104 can be operated in one of at least four modes: autonomous, semi-autonomous, "thin", and super-thin. In the autonomous mode, the client 104 is the navigation platform and supplies the informational needs of receiver 102 itself without the assistance of a webserver 106. In all other modes, the webserver 106 functions as the navigation platform.

In the semi-autonomous mode, the client 104 periodically consults the webserver 106 for information. In the thin mode, the client 104 simply passes data through between the receiver 102 and webserver 106. The thin mode is preferred as it is the one that best allows the costs of building and operating client 104 to be driven down to a minimum. In super-thin mode, time-difference and/or frequency-difference information contributed by other observers is communicated over a network to reduce uncertainties of local time and local frequency.

In operation, the receiver 102 must simultaneously search for GPS-microwave signals in two domains, e.g., frequency and code-phase. The local oscillator and Doppler shift caused by satellite vehicle relative velocity create carrier frequency uncertainties that are resolved. The instantaneous GPS-satellite pseudo-random number (pseudo-random number) code phase is another unknown. Received signals that are above the "noise floor" are relatively easy and quick to search. But weak signals, as exist inside buildings, are buried in as much as twenty decibels of noise. Each visit to a frequency/code-phase bin must dwell there long enough to "beat down" the noise floor with processing gains provided by code correlators. Weak signals also require that the search bins have finer steps between bin frequencies and bin code-phase, e.g., due to aliasing. So more bins are needed to be searched and each bin needs more processing dwell, all of which increases search time exponentially.

The webserver 106 publishes real-time navigation data to the Internet. Other services currently exist that put up partial or non-real-time navigation and initialization data on the Internet, and these can be used partially in place of, or to check the validity of real-time navigation data being sent to the receiver 102. A primary and critical role job for web-server 106 is the off-loading of navigation-computational chores from the receiver 102. The degree to which such off-loading can be carried depends on the regularity of communication contact that can be realized between the receiver 102 and the webserver 106. The actual measurements obtained by the receiver 102 are forwarded to the webserver 106.

Alternative embodiments of the present invention incorporate webservers 106 that do database processing for higher-level abstractions and purposes. For example, the server platform includes a health and quality monitor for checking said static observations and preventing an inclusion of incorrect information in said database of measurement errors and satellite data messages. On another front, webserver 106 could collect position solution information over time for the pattern of locations that receiver 102 visits over a period of hours, days, weeks, months, years, etc. Such information can then be processed to estimate where the user of receiver 102 is, where the user has been, or where the user is likely to be in the future. Such information is useful to dispatch, time-clock, house-arrest, deployment, inventory, asset management, military, security, and other kinds of applications. Position information can be interpreted to intelligently guess at what the user is doing at any one moment. For example, if the user's position matched that of a local grocery store, the user could be assumed to be shopping. Logs can also be generated by the user at the webserver 106, e.g., by city maintenance department collocating with and "marking" in the electronic database the permanent location of a fire hydrants, power transformers, roadways, etc.

The presence on the Internet of information about a user's position can be used by advertisers and marketers to direct contextual messages to the user in real-time. Such data is sold in real-time in a business model embodiment of the present invention.

In one embodiment of the present invention, a user wears the receiver 102 and wirelessly connects to client 104. A ski run by the user, for example, could be recorded and displayed later at a kiosk. A jogging outing, in another example, could be analyzed by a personal trainer to check on specific exercise regimes. In such applications, the receiver 102 could be fully integrated into a wrist watch with current semiconductor technology.

Embodiments of the present invention increase receiver sensitivity, and simultaneously reduce search times, by copying signal samples obtained by SOC receiver 102 for many processors that run different bin frequency/code-phase hypotheses in parallel. On average, the correct bin frequency/code-phase hypothesis is found very rapidly, even indoors or inside vehicles.

In general, embodiments of the present invention use Internet webservers to process data collected by remote GPS receivers in-such ways that signal sensitivity is increased and search times are shortened compared to conventional receivers and methods.

Figure 2:
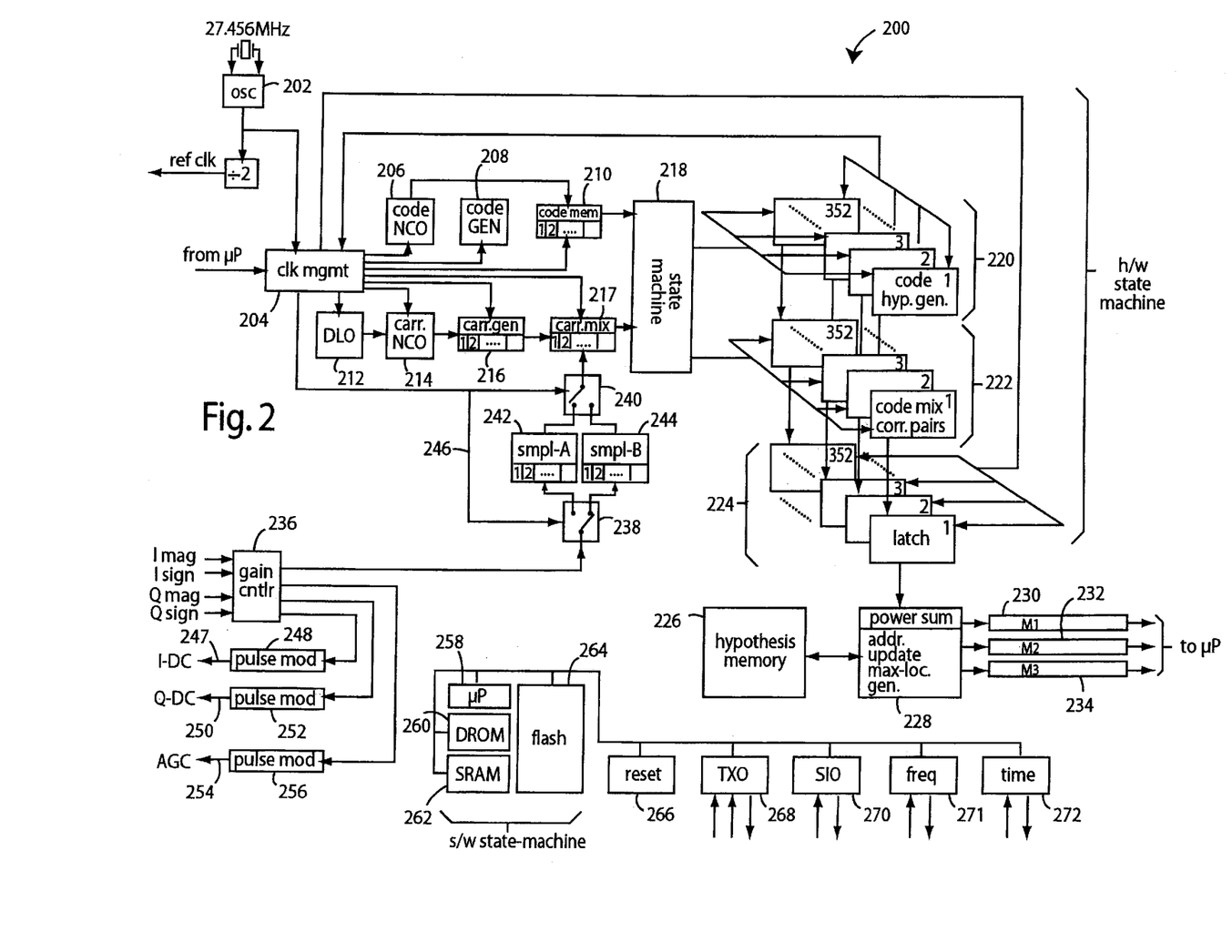
FIG. 2 is a functional block diagram of a digital signal processor embodiment of the present invention that includes a hardware-implemented state machine that keeps the receiver mixers operating and a software-implemented state machine that supplies the data needs of the hardware-implemented state machine.

FIG. 2 represents a system-on-chip (SOC) embodiment of the present invention, and is referred to herein by the general reference numeral 200. The SOC 200 includes two basic parts integrated on one piece of silicon, a hardware-implemented state machine and a software-implemented state machine. In FIG. 1, these two functional halves are illustrated separately as DSP 114 and $\mu$C 116.

The hardware-implemented state machine inputs samples from the RF stage 112 (FIG. 1). It uses dedicated gate logic to keep up with the operation of the receiver mixers. A software-implemented state machine that executes on an embedded RISC processor supplies the real-time data needs of the hardware-implemented state machine. Such embedded RISC processor can be implemented with the XEMICS (Switzerland) coolRISC™ CR816 commercial device. The software-implemented state machine typically communicates with the $\mu$C 116 (FIG. 1) via serial communication channels.

The SOC 200 provides a clock oscillator 202 and a clock manager 204 that drive a code numerical-control oscillator (NCO) 206, a code generator 208, an eighteen-part code memory 210, a digital local oscillator 212, a carrier NCO 214, a ten-part carrier generator 216, and a ten-part carrier mixer 217. A finite state machine (FSM) 218 generates data to populate three hundred fifty-two ten-part code hypothesis memories 220, three hundred fifty-two code-mix correlator pairs 222, and three hundred fifty-two paired latches 224. A hypothesis memory 226 interfaces with a power sum register 228 that receives information distilled from the paired latches 224. A set of M1, M2, and M3 locations 230, 232 and 234, and power registers output to the $\mu$C 116.

A gain controller 236 feeds in-phase ("I") and quadrature ("Q") samples to a multiplexer 238. A data selector 240 periodically switches between drawing stored samples from a sample memory-A 242 and a sample memory-B 244. A sample control signal 246 determines which memory is being filled and which is being read in any one period. The gain controller 236 provides an "I"-DC-offset signal 247 via a first pulse frequency modulator 248. A "Q"-DC-offset signal 250 is feedback via a second pulse frequency modulator 252. An AGC-feedback signal 254 is output via a third pulse frequency modulator 256.

The $\mu$C 116 software-implemented state machine part of SOC 200 is preferably based on an embedded, low-power, reduced instruction set (RISC) processor 258, with a XEMICS (Switzerland) coolRISC™ reduced-instruction-set computer (RISC) microprocessor. Ultra low-power digital cell libraries CooLib™ and 8-bit RISC core CoolRISC® are marketed too as IP-products. See, "http://www.xemics.ch". The software-implemented state-machine firmware uses a read-only memory (DROM) 260, a static random access memory (SRAM) 262, and a flash memory 264. A power-on reset logic 266 provides for power-on resets. A temperature compensated crystal oscillator (TCXO) 268 provides a stable timing base for the RISC processor 258. Communicates between the RISC processor 258 and the client 104 (FIG. 1) are handled through a serial input/output (SIO) peripheral 270, e.g., RS-232, universal serial bus (USB), Ethernet, etc.

A frequency-difference communication port 271 participates in the distribution of information over a network that help reduce the local frequency uncertainties of the SOC 200. A time-difference communication port 272 similarly participates in the distribution of information over a network that help reduce the local time uncertainties of the SOC 200. One or both are used in search strategy formulations that can improve time-to-first-fix, receiver sensitivity, and solution accuracy. Such improvements are typically achieved in post-processing by downstream data consumers. For example, the network server.

Figure 3:
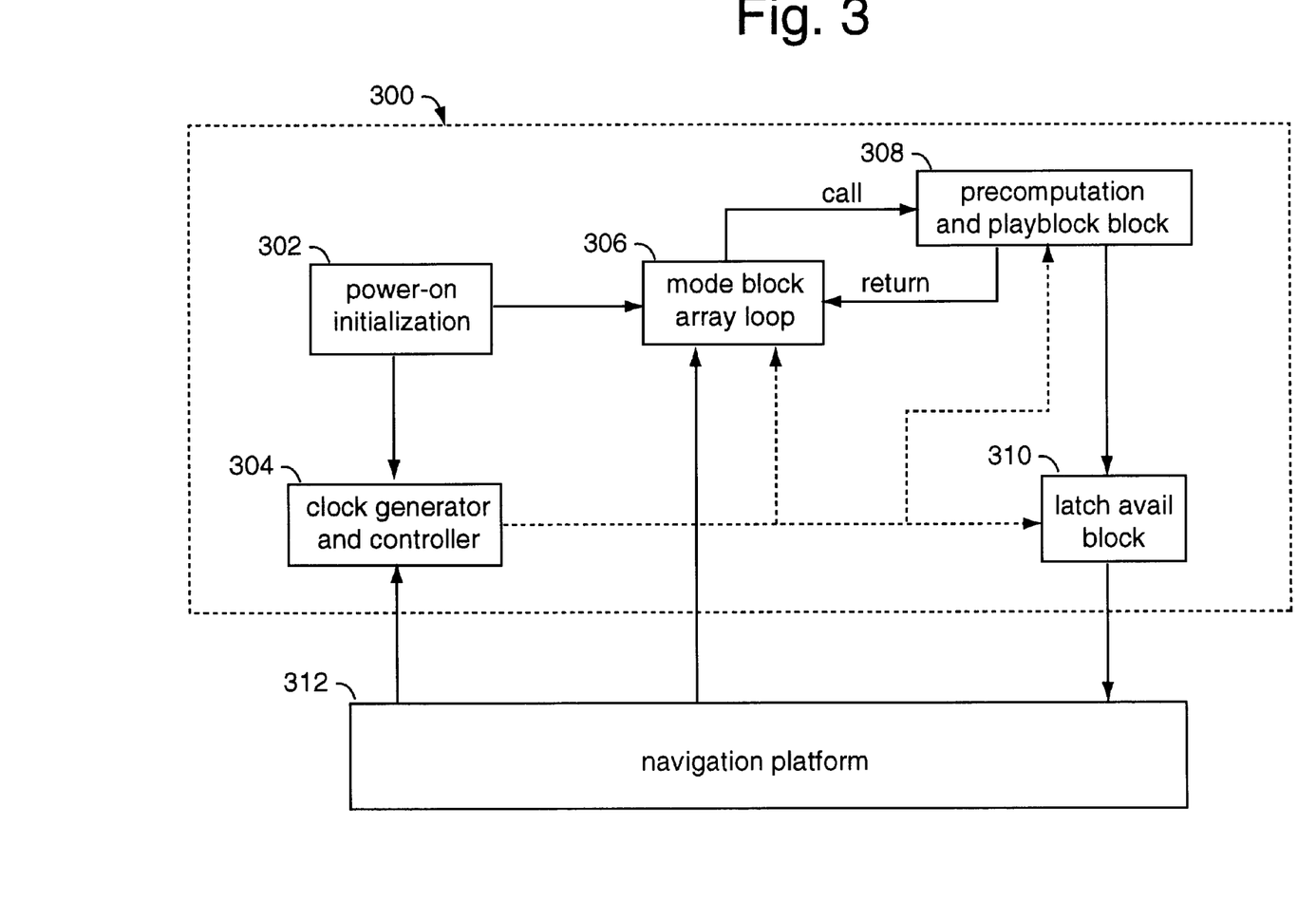
FIG. 3 is a top-level functional block diagram of the firmware operating system executed by the embedded RISC processor and its interface to the navigation platform.

FIG. 3 represents a state-machine control program embodiment of the present invention, and is referred to herein by the general reference numeral 300. The state-machine control program 300 includes a power-on initializer 302, a clock generator and controller 304, a mode block array program-control loop 306, a precomputation and playback block 308, and a latch-available block 310. The FSM 300 is typically interfaced and responsive to a navigation platform 312. Such navigation platform 312 is hosted on the client 104 in the fully autonomous mode and on the webserver 106 in the thin-client and semi-autonomous modes. The navigation platform is essentially where the navigation solutions are calculated.

The state-machine control program 300 typically places the supporting hardware in a deep sleep after power-on and initialization, e.g., by manipulating clocks and executing a halt instruction in the RISC processor 258 (FIG. 2). An interrupt on a serial input line will wake up the clock generator and controller 304. This wakes up the software-implemented state machine. A millisecond interrupt generation (MSEC=On) begins and starts incrementing a master timer Msec 24. A temperature sensor, time-difference counter, and frequency-difference counter each take a default measurement. The RF and sample clock (SCLK=on) are turned on, causing an AGC program-control loop to activate. A sample memory A or B must wait for the AGC program-control loop to be initialized and become stable.

The sample memory is manually turned on and off, e.g., by writing to a "sampleMemoryControl" flag. A value of "1" turns on the memory and a value of "0" turns it off. The sample memory is preferably automatically turned on whenever a new valid mode block is defined. The navigation platform can command other modes too, e.g., by turning each of the "RF" and "Msec" flags on or off. The RF=OFF and Msec=ON mode is used to maintain time but skip tracking any satellites. This uses less power when the GPS fix rate is slow, e.g., every ten seconds. The RF=OFF and Msec=OFF modes allow the finite state machine 300 to be returned to the deep sleep mode. The RF=ON, Msec=ON and sample-memory=OFF modes keep the RF-AGC active, wherein no satellites are tracked.

The power-on initializer 302 sets the default states for a number of finite state machine variables. Variables that are local, i.e., not in a mode block, are identified in code explicitly in their first usage. Otherwise, all variables are in the mode block. Table "I" represents one way to implement the power-on initializer 302 in software. Two variables, MBP and LAP, are initialized before starting the playback clock.

TABLE I

/* Initialize the mode block pointer */
MBP=numModeBlocks    (not in mode block)
/* Initialize the latch active pointer */
LAP=numModeBlocks    (not in mode block)
latchAvailinit=0    (not in mode block)
/* Clear state of playback*/
playbackState=0    (playbackStateCnt=off)
/* Clear all the mode blocks */
f or (1,0; "I"<numModeBlocks; "I"++) {
    blockStatus=0 (undefined)
    blockWriteFlag=0
    SV=0
    DSPMode=0
}
/* Wake up the software-implemented state machine and then put it to sleep */
initCoolRise() [execute a halt command inside software-implemented state machine firmware]
/* Put all clocks to sleep */
SCLK=off    (not in mode block)
MSEC=off    (not in mode block)
PCLK=off    (not in mode block)
/* Clear master timer */
msec24=0    (not in mode block)
/* At this point, all circuits are sleeping but initialized */

Figure 4:
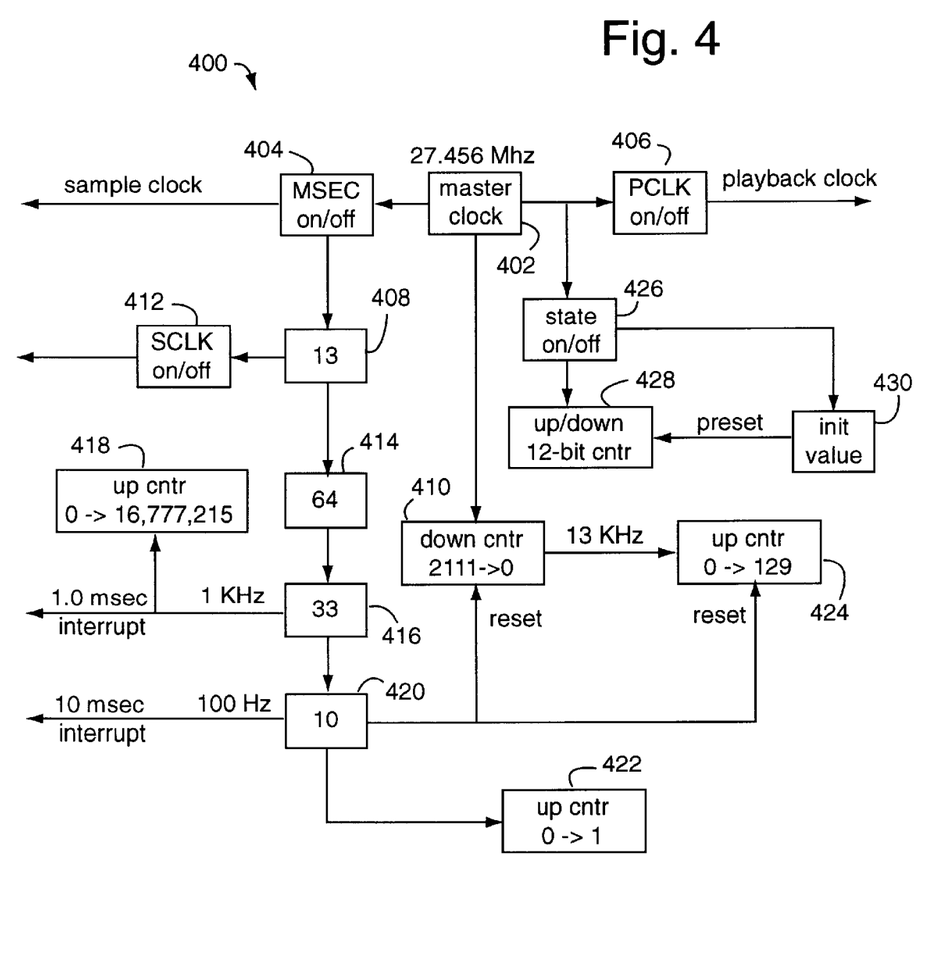
FIG. 4 is functional block diagram of the clock generation and control included in the receiver of FIG. 1.

The logic of clock generator and controller 304 is further detailed in FIG. 4. A clock generator and controller 400 includes a master clock (MCLK) that operates at 27.456 MHz, for example. A MSEC data selector 404 allows software control by RISC processor 258 of a master clock (MCLK) output. Similarly, a PCLK data selector 406 allows software control of a playback clock output. A "÷13" divider 408 reduces the master clock frequency to the sample clock frequency. A programmable down counter 410 reduces the master clock to a 13.0 KHz clock when loaded to count 2111 down to 0. A SCLK data selector 412 allows software control of a sample clock (SCLK) output. A "÷64" divider 414 and a "÷33" divider 416 are in series and reduce the master clock frequency to a one-millisecond pulse frequency. A programmable up counter 418 counts 16,777,215 cycles of the master clock. A "÷10" divider 420 reduces the master clock frequency to a ten-millisecond pulse frequency, e.g., for use as an interrupt. The clock generator and controller 400 further includes an up counter 424, a state on/off writeable data selector 426, a programmable up/down 12-bit counter 428, and a writeable initialization value register 430.

For a valid mode block, the software-implemented state machine must initialize a mode block. Only the software-implemented state machine can write data into the mode block that defines a number of parameters. The FSM 300 cannot write such data after initialization. The software-implemented state machine sets the blockWriteFlag=1 so this block is not selected by the finite state machine until the flag is cleared. After writing the appropriate data, the software-implemented state machine sets blockWriteFlag=0.

Any time the software-implemented state machine clears a blockWriteFlag (changed from "1" to "0"), the finite state machine records this event with the newModeBlockFlag. This is an finite state machine variable and is global, e.g., not mode block specific.

The mode block array program-control loop 306 represents a main program program-control loop of the finite state machine 300. The top of the program-control loop is reached whenever a startOfNewRecord event occurs, and also whenever the program-control loop is idle and a newModeBlockFlag is set. Some variables are global to the finite state machine 300. An "MBP" variable is a 5-bit address mode block pointer, wherein 0–16 are possible values. A "numModeBlocks" variable stores the number of defined mode blocks in the mode block array (MBA). A "recordToggle" flag is a one-bit counter that changes each ten milliseconds. A "Msec4" variable is a four-bit counter that changes every millisecond, in fact, it equals the four least-significant bits of the "Msec24" variable.

Two variables, "playbackState" and "playbackStateCnt", are used to monitor the number of master clocks consumed in each step of the finite state machine. These variables are used mainly to observe how the finite state machine is working. However, they can also be used to prevent race conditions, as known when the finite state machine is in certain critical areas where global data used by more than one finite state machine block are written. The playbackState is changed according to the location in the state machine. The counter can be either an up or down counter, depending on how the counter is initialized. Initializing to zero makes the variable an up counter, whereas initializing to a non-zero values make the variable a down counter. When playbackState is in the zero state, the playbackStateCnt is forced to idle.

TABLE II

```
/* LOOP POINT TO BE JUMPED TO */
LOOK_FOR_ACTIVE_MODE_BLOCK:
/* declare at top of program-control loop */
playbackState=1    (look for a mode block)
playbackStateCnt=0    (up counter)
/* First look for a mode block being processed which is cancelled. */
if (MBP < numModeBlocks) {
    /* Send lost playback event */
    stoppedPlayback=1, stoppedPlaybackdata=MBP
    blockStatus + playbackStoppedEarly
}
/* Now look for an active mode block to process */
for (MBP=0; MBPnumModeBlocks; MBP++) {
    if (blockWriteFlag==1) continue (means go to end of program-control loop and increment MPB)
        if (SV==0) continue
        if (bSPMode==0) continue
        if ((blockStatus & OxOF)==(started and not finished))
            goto PLAY_THIS_MODE_BLOCK
        if ((blockStatus & OxOF)==(defined and not started)) {
            if (startMode==SIMPLE) {
                if ((toggleinit==recordToggle)
                and (waitTillNextRecord==0)) {
                    goto PLAY_THIS_MO**E_BLOCK
                }
```

TABLE II-continued

```
            else if ((toggleInit !=recordToggle)
            and (waitTillNextRecord==1)) {
                goto PLAY_THIS_MOtE_BLOCK
            }
        }
        else if (startMode==TIMED) {
            if (msec4init==msec4) {
                goto PLAY_THIS_MODE_BLOCK
            }
        }
}
else {
    continue
}

PLAY_THIS_MOtE_BLOCK,
    Execute the precompute and playback block
    }
}
/* Loop is finished and MPB=numModeBLocks */
playbackState=0    (counter is idle)
/* Look for new mode blocks written lately */
if (newModeBlockFlag) {
    newModeBlockFlag=0
    goto LOOK_FOR_ACTIVE_MODE_BLOCK
}
```

Care must be used when clearing the newModeBlockFlag. The variable must not be cleared on the same clock as the clearing of blockWriteFlag by a software-implemented state machine. This would prevent the mode block from being executed in the case that the MBP=numModeBlocks or the mode block address being written is less than the current MBP.

The precompute and playback block 308 runs whenever the modeBlockpointer is set to a new active mode block. Control jumps here from the mode block array program-control loop and returns to the program-control loop when done. A jump out can occur if a startOfNewRecord event occurs. A block status in the mode block will get tagged with stoppedPlayback flag. The software-implemented state machine decides how to respond to such situation.

TABLE III

```
/* declare control is inside the block */
playbackState=2    (start precompute)
playbackStateCnt=0    (up counter)
/* INIT FIRST TIME IF REQUESTED */
if (requestModeBlockReset) (
firstRecord=1
startingRecordCnt=recordMsec24
recordCnt=0
playbackCnt=0
compareState=0
blockStatus=0
blockStatus 1=defined(OxOl) + started(0x02)
}
else {
firstRecord=0
}
/* MORE INIT EVERY TIME */
recordStartingCompareState=compareState    (not in modeBlock)
codeWindowCnt=0    (not in modeBlock)
freqCnt=0    (not in modeBlock)
mixFreq=carrierNco Value    (not in modeBlock)
codeGenReload=0    (not in modeBlock)
lastPlaybackOf Record=0
codePhaseBug=0
/* The following set variables are not in the modeBlock */
if (tSPMode==SEARCH) {
primingAdjust=31
codeMemPrimingSclks=2
vcgMemPrimingSclks=numHypotheses
```

TABLE III-continued

```
numSvcgen=0 (svcgenStep undefined permissible)
}
else if (if (bSPMode==WEAKMEAS) {
primingAdjust=62
codeMemPrimingSclks=3
vcgMemPrimingSclks=numHypotheses
numSvcgen=16
svcgenStep=2
}
else if (*SPMode==TIMETRACK) {
primingAdjust=16*31=496
codeMemPrimingSclks=17
vcgMemPrimingSclks=0
numSvcgen=numHypotheses
svcgenStep=hypothesisSpacing
}
/* LOOP POINT TO BE JUMPED TO */
START_PRECOMPUTE,
/* *eclare inside frequency precompute block */
playbackState=3    (carrier precomputation)
playbackStateCnt=0    (up counter)
if (mixFreq < 0) {
mixFreq=–mixFreq
    codetopplerIsNegative=0    (not in modeBlock)
    carriertopplerIsNegative=1    (not in modeBlock)
}
else {
    codetopplerIsNegative=1    (not in modeBlock)
    carriert*opplerIsNegative=1    (not in modeBlock)
}
/* super virtual-carrier NCO PRECOMPUTATION */
Precompute and load, RSCdivide, offset & delay for all 10 VNCOs using
mixFreq and carrierbopplerIsNegative as input
/* beclare inside code precompute block */
playbackState=4    (code precomputation setup)
playbackStateCnt=0    (up counter)
if (firstRecord) (
codebopplerNcoShift[freqCnt]=0
codebopplerNco[freqCnt)=mixFreq / 16
}
codebopplerNcoStep=(mixFreq + 16) / 32
desiredCodePhase=startingCodePhase + codebopplerNcoShift[freqCnt]
hwPhase=desiredCodePhase + primingAdjust startingChips=hwPhase>>6
codeNcoInitialCondition=hwphase & Ox3F if (codeNcoInitialCondition)
startingChips + 1
playbackCompareState=recordStartingCompareState
for (msec=0; msec < 5; msec++) {
if (playbackCompareState) compareValue=11947
else compareValue=11946
if (codebopplerNco[freqCnt] >=compareValue) (
codebopplerNcoShift[freqCnt] +=1
codebopplerNco[freqCnt] –=compareValue
}
vcgbelay=codebopplerNcoShift[freqCnt]
for (svcg=1; svcgen < numSvcgen; svcg++) { /* SVCGEN
PRECOMPUTATION */
break vcgbelay into codeTap * 31 + offset and initialize
VCGen[svcg][msec] using vcgbelay and codebopplerIsNegative as input
vcgbelay +=svcgenStep (note, if "search" mode, this line has no effect)
}
playbackCompareState + 1
if (playbackCompareState==3) playbackCompareState=0
codebopplerNco[freqCnt] + codebopplerNcoStep
}
if (playbackCnt==0) compareState=playbackCompareState
if (numCodeWindows> 1) {
    codeGenStrobe=1    (not in modeBlock)
    codeGenStrobeCnt=numHypotheses (not in modeBlock)
}
else
    codeGenStrobe=0    (not in modeBlock)
/* beclare doing CObE MEM priming */
playbackState=4
for (playbackStateCnt=codeMemPriming; playbackStateCnt > 0;
playbackStateCnt––) { primeCodeMem (run codeNco, codeGen, &
codeMem only, i.e., no mix)
}
/* beclare doing VCG MEM priming */
playbackState=5
```

```
for (playbackStateCnt=vcgMempriming; vcgMemPriming > 0;
vcgMemPriming––) ( primeVcgMem (run codeNco, codeGen, codeMem,
selected super virtual code generators, & vcgMem only)
}
/* LOOP POINT TO BE Jumped TO */
START_PLAYBACK,
Clear only correlators to be used
numLatchesActive=number of active correlators (not in mode block)
HOW TO COMPUTE THIS ONE? {
Search,    numHypotheses
WeakMeas,    16 * numHypotheses
TimeTrack,    function of numHyptheses, BTTmode, and BTTmsec
}
Reset carrier generation, initialize digital local oscillator, carrierNco,
RSC data compute sclkEpoch and ncoEpoch based on desiredCodePhase
for debugging
sclkEpoch=function of (desiredCodePhase)    (not in modeBlock)
ncoEpoch=function of (desiredCodePhase)    (not in modeBlock)
noEpoch Yet=1 (not in modeBlock)
/* Declare doing the playback */
PlaybackState=6
for (playbackStateCnt=2112; playbackStateCnt <=0; playbackStateCnt––)
{ if
(playbackStateCnt > 0) {
1* DO THE MIX */
do the mix with the sample data (PCLKOn)
if ((codeGenStrobe) and (playbackStateCnt==codeGenStrobeCnt)) strobe
codeGen and save data
if (noEpoch Yet and (Gi epoch==1)) {
if (sclkEpoch 1=playbackStateCnt) or (sclkNco 1, codeNco)) { if
(codeGenReload) codePhaseBug + playbackCnt < 4
else codePhaseBug +=playbackCnt
}
noEpoch Yet=0
}
}
else (
/* LATCH THE CORRELATORS *1
/* Look for bad condition of still processing latch data */
if (LAP < numModeBlocks) {
send event missedLatchData, data=LAP
}
playbackState=7
LAP=modeBlockPointer
playbackState=8
}
}
/* Increment counter one time per record */
if (playbackCnt==0) recordCnt + 1
/* Increment counters on each playback */
playbackCnt +=1
codeWindowCnt +=1
/* Loop control for multiple code windows in "search" mode */
if (codeWindowCnt < numCodeWindows) {
playbackState=9
re-load the strobed codeGen block back into the block
codeGenReload=1
desiredCodephase +=numHypotheses * 31
goto START_PLAYBACK
}
/* Loop control from multiple frequencies */
freqCnt +=1
if (freqCnt < numFreq) { playbackState=10 mixFreq +=freqStep
codeWindowCnt=0 goto START_PRECOMPUTE
}
/* Done with playbacks for this mode block */
playbackState=11
lastPlaybackOf Record=1
```

The latch avail program-control loop 310 responds to new latch data. The latches are never cleared, they are only written to at the end of each playback. If they are not processed before the next playback, the data is lost and not reported as an error. The availability of new latch data is announced when the latchActivePointer (LAP) variable is set to a valid mode block value less than the number. of mode blocks (numModeBlocks). Thus, operation of the latch avail block is event driven. As soon as the latchActivePointer goes to a value less than numModeBlocks, the block runs. However, if the initialization of the latch avail processing takes more than a few clocks, initialization must be done prior to the data actually becoming available.

HypMem has a new method that can use the bank and cell address blocks that auto-wrap without actually using the memory cells. In this way, doing the outdoor mode not using the hypHem, can still use these two registers for remembering the location of the maxData. This method is added to France's hypMem macro description.

If maxData is requested, it is updated every record. Thus, maxbataUpdateRate becomes a one-bit word and is replaced by the work maxDataUpdate. The maxDataReportRate is removed and is handled in software.

Assume that when a playback is finished, the working correlators are copied to the correlator latches, latchAvail is set to one, and the latch avail pointer (LAP) is set the working mode block pointer (MBP).

If maxData is not being processed, any new playbacks are reported when all the playbacks for a mode block are completed. This check could be done in the pre-computation and playback block, but it is preferable to do this step in one section only. This is done in the latch avail block since we want to wait for the maxData to be updated before we announce to the software-implemented state machine that a mode block has been processed for another record.

As soon as a new mode block is begun, it is likely that the latch data is still being processed from the last playback of the previous mode block. Thus, the data associated with the maxData analysis in the normal precomputation section cannot be initialized. So an initialization program-control loop must be called for each mode block at each record.

TABLE IV

```
/* TEST POINT TO FOR NEW LATCH AVAIL INITIALIZON *1 TEST
LATCH AVAIL INIT,
/*Initialize latch avail block for current mode block */
if ((LAP==numModeBlocks) and (latchAvailInit==0)
and (MBP < numModeBlocks) and (MPB->maxDataUpdate)) {
/* Use the mode block pointer MBP in this section */
/* Setup hypMem on the first playback of each record */
if (useHypMem) {
execute command, hypMemActive1 bankAddressReg=hypMemBank
bandAddressCell=hypMemCell execute command, loadHypMemAdd
}
else {
execute command, hypMemActive0 bankAddressReg=0
bandAddressCell=0 execute command, loadHypMemAdd
}
/* Clear maxData only on the first playback */
if ((resetMaxbataEvery) or (firstRecord and (resetMaxDataFirst)))
maxi=max2=max3=max4=0
/* Initialize local variables */
bigPowerThisLatch=0
overflowThisLatch=0
/* Declare initialized */
latchAvailInit=1
}
/* TEST POINT TO LOOK FOR NEW LATCH AVAIL PROCESSING
*/ TEST_LATCH_AVAIL_PROC,
if ((LAP < numModeBlocks) and (maxDataUpdate)) {
/* Now analyze the latches */
for (1=0; InumLatchesActive; }++) {
1 *
Analyze } and "Q" of current latch to look for
big power. (assume MSB=bit13 and LSBbit0)
for } correlator,
if ((bit-13=1, and (bit-12 or bit-il or bit-10 is 0)
or (bit-13=0, and (bit-12 or bit-il or bit-10 is 1)) bigPowerThisLatch=1
else for "Q" correlator,
if ((bit-13=1, and (bit-12 or bit-il or bit-10 is 0)
or (bit-13=0, and (bit-12 or bit-il or bit-10 is 1)) bigPowerThisLatch=1
else
```

TABLE IV-continued

```
bigPowerThisLatch=0
if (bigPowerThisLatch or largelomsecPower) {
compute thisPowerSum with only } and "Q" using method2
if (largelomsecPower==0) { large10msecPower=1 maxi=thisPowerSum
maxLoc1=current bank and offset max2=max3=max4=0 goto
THIS_LATCH_FINISHED
}
}
else {
if (useHypMem) (
if (firstRecord and clearHypMem)
thisPowerSum=0
else
thisPowerSum=hypMem at current offset
}
else {
thisPowerSum=0
}
thisPowerSum +=power computed using method 1
if (overflow detected) { thisPowerSum=2*'24 − 1
if (hypMemOverflow==0) (hypMemOverFlow=1 maxi=thisPowerSum
maxLoc1=current bank and offset
max2=max3=max4=0 goto THIS_LATCH_FINISHED
}
}
}
/* Replace if new power is LARGER */
if (thisPowerSum > maxi) { max2=maxi maxLoc2=maxLoc1 max3=max2
maxLoc3=maxLoc2 max4=max3 maxLoc4=maxLoc3 maxi=
thisPowerSum
maxLoc1=current cell and bank in hypMem
}
else if (thisPowerSum > max2) { max3=max2 maXLoc3=maxLoc2
max4=max3 maxLoc4=maxLoc3 max2=thisPowerSum
maxLoc2=current cell and bank in hypMem
}
else if (thisPowerSum> max3) { max4=max3 maxLoc4=maxLoc3
max3=thisPowerSum
maxLoc3=current cell and bank in hypMem
}
else if (thisPowerSum> max4) { max4=thisPowerSum
maxLoc4=current cell and bank in hypMem
}
THIS_LATCH_FINISHED,
}
}
if (LAP < numModeBlocks) (
/* Report new playback if all playbacks are finished */
if (lastplaybackOfRecord) (
/* Report normal playbacks */
send newPlayback interrupt
newPlaybackWord +=(OxOl << (LAP)
/* Report termination of record due to big power */
if (largelomsecPower or hypMemOverflow) (
/* Update mode block status */
if (largelomsecPower)
blockStatus + (finished + largelomsecPower)
else if (hypMemOverflow)
blockStatus + (finished + hypMemOverflow)
}
/* Finished with latch data for this mode block */ LAP=numModeBlocks
LatchAvailInit=0
}
}
```

A problem occurs when setting the LAP back to the quiescent state of numModeBlocks if the playback block is also going to set the LAP to the current MBP on the same clock. Above in the playback block, the playbackState was set to seven just prior to writing the new LAP. Thus, any change to the LAP should wait if playbackState=7.

In order to get a high degree of parallelism, a large bank of code hypotheses is implemented in parallel that use the same carrier mix. For the most flexibility, virtual code generators are preferred for synthesizing a mostly likely chip spacing for "search" mode, and a narrower spacing for "timeTrack" mode. However, for a large number of code hypotheses, the implementation with virtual code generators may be too expensive.

The period of the 2.112 MHz sample clock is approximately half a chip time. To be exact, it is thirty-one sixty-fourths or one sixty-fourth less than a half chip. For this spacing, the number of code hypotheses to cover the 1023 chip range is 2112. This requires three percent (sixty-six extra code locations) more memory space than the 2046 locations needs for a perfect_chip spacing.

Recent test data indicates the a priori worst-case modeling error for a typical crystal frequency is around ±0.5 PPM (±787 Hz) with temperature modeling. To be conservative, and leave some uncertainty for user position error effect on the frequency, a frequency range of ±1000 Hz for the first satellite is preferably searched. If there is a high degree of confidence about the frequency information learned in a first search, the frequency search range of subsequent satellites can be constrained to save time and effort. Alternatively, such searching-time savings could be traded for a slower clock speed as would be found in less expensive hardware.

A "predetection interval" (PDI) is the coherent integration period of incoming and locally generated signals that ends just before squaring to get the power. For a ten-millisecond predetection interval, the frequency response of the carrier mix is a sync function with the first nulls at ±100 Hz. Typically, the frequency search step is chosen so that the next frequency searched has its peak at the null of the previous frequency. In this case, every one-hundred Hz is searchede and the 1.5 dB bandwidth of each frequency search step is ±50 Hz. Twenty complete code searches are needed to cover the desired range of ±1000 Hz.

In a two-buffer RF-sample scheme, each code hypotheses defined by a bank of correlators is updated for a complete ten-millisecond predetection interval in just 2112 clocks, e.g., the number of sample clocks in one millisecond. The RF-samples are taken with the same sub-millisecond time in all ten milliseconds. These are then mixed and correlated on a single sample clock, therefore a new set of samples is read every sample clock. In ten milliseconds, and at 27.456 MHz, there are 27456 master clocks that can produce one-hundred-thirty groups of 2112 samples. A group of 2112 samples that mixes a particular code and frequency hypothesis is referred to herein as a "playback".

If twenty complete code searches were done in one-hundred-twenty playbacks with some left over clocks needed for setup, then the number (N) of playbacks required to do one code spectrum (1023 chips) is 20*N=120. In this example, N=6. The number of "I" and "Q" correlator pairs is thus 2112/6=352, for a total of 704 correlators. Such is represented in FIG. 2.

An alternative embodiment increases the master clock speed by a factor of two, e.g., to yield a total of two-hundred-sixty playbacks. The number of playbacks can be increased to twelve to get one complete code spectrum. In this way, only one-hundred seventy-six correlator pairs are needed for a total of three hundred fifty-two individual correlators. For this example, one-hundred seventy-six correlators are selected with a playback speed of 2*(27.456 MHz)=54.912 MHz.

The code NCO 206 is a six-bit adder which converts 2.112 MHz sample clocks to 1.023 MHz. It generates a code clock and a div3 signal when there are three sample clocks needed for one code clock rather than the normal two sample clocks. There is no shifting capability, but the phase can be adjusted by specifying an initial condition variable "ncoInitialCondition".

The code generator block 208 uses two 10-bit shift registers to generate a particular pseudo-random number sequence. This block includes three table lookups based on the desired chip phase and the pseudo-random number, they are G1, G2, and G2 offset.

The code and div3 memory 210 uses two shift registers to strobe and delay the code generator and div3 output signals on the same sample clock. The delay depth is worst-case seventeen one-bit states for each signal. These are the input signals to the virtual code generators for search or "meas-mode".

The virtual code generator block can synthesize a relative delay of ±31 sixty-fourth chips relative to the code in delay register. Positive delays use a combination of the punctual tap and the late tap. Early delays use combination of the punctual and the early tap. There is one group of five virtual code generators used in "search" mode and then another pool of 15*5 virtual code generators, for a total of 16*5=80, used in "timeTrack" mode.

A set of five virtual code generators is referred to herein as a "super virtual code generator". Such produces the phases needed across a ten-millisecond record to compensate for the Doppler trajectory.

The virtual code generator memory 208 includes a set of five one-bit shift registers with length is one-hundred seventy-six on the output of the five virtual code generators used to generate the code Doppler for the ten-millisecond predetection interval in "search" mode. The earliest state-0 is the direct output of the virtual code generator. The final state, "one-hundred seventy-five", is delayed one hundred and seventy-five sample clocks from state-0.

The code shift memory is used to strobe the state of the entire code generation block on a specified sample clock. This data is reloaded on a subsequent playback to generate a virtual code shift.

The digital local oscillator (DLO) 212 divides the sample clock by sixteen and generates a sixteen-state variable called dloState that counts up from zero to fifteen at one-hundred thirty-two kHz. It is used to generate the final IF of the signal output from the final RF stage.

The carrier NCO 214, or master carrier NCO, is a twenty-four-bit register, with the sample clock divided by four as its input (528 kHz), where the four most significant bits are decoded as the ncoState that counts up or down zero to fifteen at the frequency (down if frequency is negative) that corresponds to the carrierNcoValue.

The sumState is a four-bit number that is the sum of the dloState and the ncoState. It represents the phase generated by the sum of the Doppler and the final IF.

The realStateCount variable counts the number of consecutive sample clocks where the state of the master carrier NCO does not change. The variable can also be delayed by pre-dividing the counter before incrementing the count. This is needed to accommodate accommodate the limited range of the four-bit delay when the Doppler is very small.

A super virtual-carrier NCO is a group of virtual carrier NCOs that generate the same frequency as the master carrier NCO, but at phase offsets that are modulo one millisecond delayed from the master carrier NCO phase. Each virtual-carrier NCO has two four-bit registers, e.g., the "offset" and "delay". Each virtual-carrier NCO generates a four-bit phase offset from the phase of the sumState. The delay variable can add one addition-bit of delay when the current realStateCount exceeds the delay variable, or advance when the Doppler is negative.

The carrier mix 216 mixes the RF-samples with the carrier phase generated by each of the ten NCOs. There is only one carrier mixer. All ten milliseconds of samples are mixed at one time in the same sub-millisecond phase.

The code mixer provides massive parallelism, up to one-hundred seventy-six different code hypotheses can be generated each mix in "search" mode. In "timeTrack" mode, only sixteen are available since eleven correlators are needed to isolate the mix in different epochs. For each hypothesis, there is a mixer and an in-phase and quadrature integrator, e.g., the "I" and "Q" correlators 222.

The hypotheses latches 224 are holding registers for the "I" and "Q" of the latest hypothesis. Latching is used so the next mix can commence without waiting for the RISC processor 258 to read the data. Each new mix will overwrite the old data, so the RISC processor 258 reads have until then to fetch the latched data.

The digital signal processing is controlled by a number of different variables that can be written. The satellite vehicle pseudo-random number (SV:PRN) variable is written to define a new search. Orbiting GPS satellites use pseudo-random number codes 01–32. WAAS and pseudolites are defined in the 33–4x range. A word length of six-bits is the minimal requirement. The code starting phase variable is "StartingCodePhase" and defines the relative starting phase in sixty-fourth parts of a chip. This is a two-byte unsigned word, and represents the phase of the right-hand-side of the very first code window in "search" mode and the left-hand-side of the code window in "meas-mode". The codephase range is 0–(1023*64–1)=0 to 65471. There are sixty-four unused values that are respected when adjusting the codephase. The StartingCodePhase number can be broken into chips and sixty-fourths easily.

TABLE V startingPhaseChips=startingCodePhase >> 6
startingPhasesixty-fourths=startingCodePhase & Ox3F For example, a code phase of one hundred chips and seventeen sixty-fourths of a chip has a startingCodePhase=6417. When crossing an upper boundary by adding more than 1023*64, only one chip of phase is added since the dead zone borrows one integer chip in a roll over from a large phase to a small phase.

Similarly, when subtracting a positive phase from a small starting codephase, the method rolls under and occupies the dead zone passing to a large codePhase. The correction is to subtract one since the uncorrected phase is one too large moving from small phase to large phase.

The Doppler start "carrierNcoValue" variable is defined in carrier-NCO units of bits. A three-byte signed word is used to represent the carrier Doppler in number of cycles per second. A final intermediate frequency (IF) of one hundred thirty-two kHz does not need to be included in this variable, the final IF is demodulated by a sixteen state digital local oscillator outside of the carrier NCO. The carrier NCO has twenty-four bits with an input clock that is the sample clock divided by four. The scale factor to convert the carrierNcoValue from-bit to Hertz is CARRIER_NCO_HZ_PER_BIT=2.112 MHz/4/2^24=0.031471252 Hz/bit.

To convert a carrier Doppler of 5000 Hz to carrier NCO units, the Doppler is divided by the above constant to get units of bits and yield a carrierNcoValue=158875. Thus, carrierNcoValue=carrier Doppler in Hz/CARRIER_NCO_HZ_PER_BIT. This divide is done in the navigation processor, and is sent to DSP 114 in a normal control message.

There are typically three DSP operational modes, (1) "search" mode (non-coherent), (2) "weakMeas" mode (non-coherent), and (3) "timeTrack" mode (coherent). The current mode is defined with the DSPmode variable. When generating code in DSPmode="search" mode, a right-most correlator will generate a phase defined by the starting-CodePhase. Such convention simplifies the priming operation.

In two modes, there is only one frequency mix assumption, and all correlators work with the result of the ten one-millisecond carrier mixes formed with the ten VNCO's. The virtual carrier NCO's generate the coherent phase of a sine wave for a specific millisecond across a ten-millisecond predetection interval.

Since there is only one frequency hypothesis per mix, the required parallelism is generated in the code domain using a number of parallel code phase hypotheses. In this case, each pair of correlators takes the same output of the carrier mix, and then mixes a different code phase assumption.

In "search" mode (non-coherent mode), the code offset for each correlator to the right, or later, is made by delaying the code by one sample clock, e.g., exactly 31/64. Thus, in "search" mode the hypothesisSpacing is fixed and is not controllable. There is one correlator pair for each code hypothesis that-contain the In-phase and Quadrature results for a complete ten-millisecond correlation.

To accommodate a code Doppler shift that occurs over a ten-millisecond mix, and the required span of phase, five virtual code generators are used with five 176-state one-bit shift registers. These are clocked with a sample clock to produce the 31/64 of a chip spacing.

The virtual code generator produces a phase offset relative to the reference phase defined by the master code NCO and code generator.

Each virtual code generator generates the phase shift across two milliseconds to cover a ten-millisecond span. with five virtual code generators. The carrier mix for two milliseconds will use the same code mix. One virtual code generator per millisecond is-excessive because there is no long-term bias if the code-Doppler NCO is handled properly.

For a carrier Doppler of twenty kHz, the virtual code generators only need to produce ±10 sixty-fourths of a chip of phase change due to code Doppler over ten-milliseconds. This relative phase offset can be achieved with only three code versions. The early code offset, up ten sixty-fourths of a chip, will use an early code tap and the punctual tap when the virtual code generator count variable is zero. Likewise, the late code offset is generated using the punctual code tap and the late tap when the virtual code generator count variable is zero.

Only three states of the code and div3 memory block are used for "search" mode.

The output of each of five virtual code generators is passed into its own one-bit shift register that is one-hundred seventy-six states long and is clocked with the sample clock. The early tap is actually the output of the generator.

In detail, on each sample clock and after the update of the codeNco and the state of the code generator, the shift registers are clocked, causing the contents of the registers to move to the right by one cell. The previous five states on the right are discarded.

The state of the virtual code generator is considered the starting (earliest) phase and is passed directly into the first correlator pair. The priming of the code generation block for "search" mode involves two steps, priming the code and div3 memory, and then priming the memory that is the shift registers on the output of the virtual code generators. Details of priming are discussed in the priming section.

If the desired codephase is one hundred chips and seventeen sixty-fourths of a chip, then a small adjustment to the hardware phase is needed to accommodate for the early, punctual, and late delays so that the desired codephase in the punctual is generated on the first clock of the playback and that also, all delays are valid when the playback begins. To do this, the desired code phase is modified by what the priming effect is, which in the case of "search" mode when only three states from the code and div3 memory block are used, the code NCO and code generator are run for the required number of clocks until the earliest three of the registers are filled.

The punctual code in the one hundred and seventy sixth state is initialized by shifting the registers by one on the first sample clock of the playback. The delay block which is one-hundred seventy-six deep is primed in two steps. The first will prime the delay block used to feed the virtual code generators. The second priming will then fill the delay block which uses the output of the virtual code generators.

For the second priming, the virtual code generators are clocked the required number of sample clocks to fill the second delay memory. Then the desired punctual phase will be in the right-most delay register on a first sample clock of a playback.

The "weakMeas" mode is resorted to after a series of failed searches for a set of satellites. The power peaks of individual searches are revisited, this time with a finer search resolution. In "weakMeas" mode enough time is bought to search a large-number of satellites in parallel because the uncertainty is reduced.

Another type of correlator spacing can be implemented so that the result is accurate enough to make a position and velocity fix. For a simultaneous measurement of eight satellites, for example, fifteen frequencies for each satellite can be searched, and use one hundred twenty of the one hundred thirty available hypotheses. This would spare enough master clocks for precomputation between hypotheses. The center frequency can be put at the best frequency at search time, with eight frequencies on either side. A step size of fifty Hz offers a range of ±425 Hz. For a one-g acceleration model, i.e. 10 m/s$^2$ then in ten seconds, the maximum change in velocity is g*10=100 m/s=500 Hz. A step size of fifty Hz yields a worst case frequency error of twenty-five Hz, which is about five m/s of velocity. This is on the borderline of acceptable noise performance for a velocity fix. Thus, the step size can be reduced if the user dynamics are known to be smaller.

In the code domain, all one-hundred seventy-six correlators are used to generate another code search with very narrow spacing between each code hypothesis. One scheme uses a two sixty-fourths of a chip spacing so that the worst case error is one sixty-fourth of a chip, about 4.5 meters. This meets the target ranging accuracy for weak signals.

A code hypothesis spacing is generated using sixteen super virtual code generators, five virtual code generators to produce to the code Doppler profile across the ten millisecond record. The spacing of the virtual code generators is two sixty-fourths of a chip. In this way, a window of code hypotheses is generated that is 0, 2, 4, 6, 8, 10, 12, 14, 16, 18, 20, 22, 24, 26, 28, 30 sixty-fourths of a chip from a reference code tap. The outputs of virtual code generators are delayed by one sample clock (thirty-first parts) to produce a very long fine code hypothesis window.

The offset between each super virtual code generator is preferably always the same. A first virtual code generator in each super virtual code generator outputs 1=0 sixty-fourths, 2=2 sixty-fourths, 3=4 sixty-fourths, 4=6 sixty-fourths, 5=8 sixty-fourths, . . . , 16=30 sixty-fourths of a chip. The offsets of consecutive virtual code generators, in each super virtual code generator, are the same as the previous virtual code generator except for the Doppler trajectory across the ten-millisecond predetection interval. This data is programmed in a virtual-code-generator pre-computation step.

The output of each virtual code generator is sent to an eleven-bit shift register. A left most state of each shift register is the same value as the current virtual code generator output, i.e., state-0 has a delay of zero. A final state on the right is delayed ten sample clocks from the virtual code generator output.

The correlators are mapped to the code generation. A first correlator takes a code present in a first state of a first super virtual code generator delay register. A sixteenth correlator takes a code present in a first delay of the sixteenth super virtual code generator. Then the seventeenth correlator takes the second state of the shift register of the first super virtual code generator and the thirty-second correlator takes the second state of the shift register of the sixteenth super virtual code generator, etc.

The super virtual generators are used to generate a two sixty-fourths of a chip spacing. Each virtual code generator outputs the code Doppler trajectory across a ten-millisecond record. All sixteen super virtual code generators produce a phase range of thirty sixty-fourths of a chip at two sixty-fourths spacing. By delaying the output of each super virtual code generator, the comb of phase produced at thirty-one sixty-fourth increments can be replicated. The maximum number of delays possible is limited by the number of correlators. The magic number is eleven as 176=16*11. This gives a maximum range of one.

A one thirty-second of a chip search engine is produced by delaying the output of the super virtual code generators by multiple sample clocks. The total range when all eleven delays are used is three hundred forty sixty-fourths=five chips and twenty sixty-fourths of a chip. The larger lines are have an offset that is modulo-31. All the delays greater than thirty sixty-fourths are produced by the delay registers. All the delays between zero and thirty are produced by the delay registers.

In "timeTrack" mode, finer two sixty-fourths correlator spacings are generated from one sixty-fourths to thirty-two sixty-fourths, e.g., for a maximum of sixteen individual code hypotheses. Fewer hypotheses are generated so the correlators can be used for a coherent integration capability. The mix can be separated for each of ten code epochs, rather than ten separate milliseconds into different correlators.

Such enables a synchronization to the fifty Hz Navigation Data in GPS transmissions so not to integrate across any data-bit edge. This minimizes losses, and increases integer millisecond timing capabilities.

Embodiments of the present invention can be made to look like a conventional tracking receiver with an unlimited number of channels. This is referred to herein as "time-Track" mode, the time can be determined by observing the data bit, and then demodulating the navigation data to get time from GPS. This is not possible in the other two modes as the signal is too weak to observe the,navigation data. To cover ten milliseconds, eleven correlators are needed to allow optimal detection of a Navigation Data data-bit edge. The maximum number of correlator pairs used is (15*2+ 11)=41, assuming all sixteen code hypotheses are used. In this case, fifteen code hypotheses use two correlators pairs and one code hypothesis uses eleven pairs. As few as sixteen pairs and thirty-two pairs can be used in. other modes.

During conventional tracking, one code hypothesis will usually be centered on a code autocorrelation function peak. The corresponding correlator pair represents the best signal-to-noise ratio and is the best vehicle for observing any half-cycle carrier phase changes. The other code hypotheses can also observe such changes, but the number of correlators that must be read by the software-implemented state machine would be excessive.

In "timeTrack" mode, only one code hypothesis per playback represents an eleven-correlator option. The relative location of this code hypothesis is variable. The number of code hypotheses to be used on either side of the peak can be varied.

The other code hypotheses in "timeTrack" mode will split the ten-millisecond record into one or two correlator pairs. There are two options for the two correlator mode. In the first one, the 10 millisecond is split into two five-millisecond blocks. In the second, the ten-millisecond is split according to an estimate of the location of the navigation data phase reversal.

The correlators off-peak are used for the delay-lock-program-control loop. The difference in power is examined between the code hypotheses on either side of the center code hypothesis to form steering information.

The progression from search-to-tracking starts with using the search logic to find a code peak. The "search" mode hands off to the "timeTrack" mode. All the correlators are configured to output into two five-millisecond blocks until the code peak is resolved. Once the code is known, a side-lobe check is done on the frequency peak. The eleven-correlator option can detect a large frequency error in the one-millisecond outputs. After the code peak and frequency peaks are resolved, the eleven-correlator code hypothesis is placed on the peak and time is spent searching for a phase-reversal location. The result identifies the millisecond where a bit transition occurs.

The other correlator pairs remain in a five-millisecond block option until the bit transition is known. The correlators switch to output the data on either side of the bit transition into the two correlators.

As an example of the accordion mode, with sixteen code hypotheses separated by_chip for a range of eight chips. The range is two chips for_chip spacing. Tighter spacing is possible down to one sixty-fourths, and multiple playbacks can be used to generate wider code mixes with very narrow spacing.

An additional group of 15*5 virtual code generators is used to generate the accordion offset across the sixteen code hypotheses. A relative phase offset is generated from 0–15*32 sixty-fourths of a chip. However, when the code Doppler effect of ±10 sixty-fourths is included, there is a worst case range of −10 to 15*32+10, e.g., −10 to 490 (<16*31). Thus, only one early register, one punctual register, and sixteen late registers are needed. The code generator state is used as the early register.

In "search" mode, the code and div3 memory registers are primed such that the complete block is valid on the first sample clock of the playback. The code generation for "timeTrack" mode is different from "search" mode, there are no additional delays on the output of the virtual code generators. Only one priming phase exists, so it is easier to define a punctual correlator to be the second delay and the other delays are later. The first true delay as the early delay is really the output of the code generator directly. The lower correlator numbers represent earlier phase.

There are two correlator modes in "timeTrack" mode. In the "before BTT-detection" mode, the ten-millisecond pre-detection interval is broken into eleven parts which have the CA-code epoch as the border line rather the millisecond. Since only one millisecond is run, the generated epoch happens at the exact same time in each millisecond. The epoch could be delayed for each millisecond to compensate. This is not really needed since an error only occurs when there is a phase reversal caused by the navigation data, and this only effects worst case five-sample clocks in the millisecond integration where the reversal occurred.

The "before BTT-detection" mode is important in establishing the phase of the navigation data bit. After that it is enough to correlate around an expected-bit transition time into just two correlator pairs. A second mode, "after BTT detection", then can be activated. The processor firmware derives and sends the identified millisecond as a correlation dividing line. All previous data on a left-hand-side of the epoch in such specified millisecond will go into a left-hand-side (LHS) correlator. All subsequent data on a right-hand-side of the epoch in the specified millisecond will go in a right-hand-side (RHS) correlator. The data in the specified millisecond before the CA-code epoch will go into the LHS correlator whereas the data after the CA-code epoch will go into the RHS correlator.

A BTTmode variable only applies in "timeTrack" mode, i.e., DSPmode=3 ("timeTrack" mode). If BTTmode=0, then all code hypotheses use only one or two correlators depending on another variable. If BTTmode=1–15, one code hypothesis operates in the before detection mode. The eleven correlators used in the code hypothesis are equal to BTTmode. For example, if BTTmode=7, then the code hypothesis with index seven will operate in the before-BTT-detection mode. Assume that the indexing is from 0–15, which means that the 0-th code hypothesis cannot run in the before mode. This is permissible since the before option is centered between a set of after-BTT-detection mode correlator pairs.

A BTT millisecond variable specifies an expected data-bit transition point. If BTT millisecond=0, or 11–14, then only one correlator is used for the code hypotheses in the after-detection mode independent of a millisecond or the epoch. If BTT millisecond=1,10, then two correlators are used for the code hypotheses in the after-BTT-detection mode. Also, the separation is based on the epoch inside this specified millisecond. For example, if BTT millisecond=3, then the-split point is the epoch in the $3^{rd}$ millisecond.

If BTT millisecond=15, the correlation is split into two correlators in the center of the ten-millisecond record independent of the epoch location. BTTmode, BTT millisecond generate six "timeTrack" mode processing options. The two variables BTTmode and BTT millisecond, can generate five different styles of mixing for "timetrack" mode. The mixer has three options, the mix data can all be added together, split between two correlators, or separated by epoch. At least six methods can be used in the implementation.

A first method has the fewest correlators to read, no BTT, and a ten-millisecond predetection interval each correlator. BTTmode=0 and BTT millisecond=0. Each code hypothesis is output to one correlator. This is really the same as the mix for search and "weakMeas" modes. This mode is useful when lookingiat a large code window to find the power after an outdoor "search" mode and without any timing information to produce the fewest correlators to read.

There is some data loss since the navigation data phase reversal can occur inside a ten-millisecond record. However, every other ten-millisecond record will not experience such a loss. The record will be completely lost when a phase reversal is exactly in the center of a ten-millisecond period. Half the available power will be lost if the phase changes every twenty milliseconds in the center-of a record.

A second method has the second fewest correlators to read, no BTT, and two five-millisecond predetection intervals each correlator. BTTmode=0 and BTT millisecond=15. Each code hypothesis is output to two correlators that are each exactly five-millisecond in duration. This mode is useful when looking at a large code window to find the power, e.g., after an outdoor "search" mode, when no timing information is available, and when the loss due to the phase reversals is to be minimized.

In a sense, five-millisecond power computation can be done, or the phase reversal can be spotted so not to integrate across it. A five-millisecond predetection interval option is also useful for finding a frequency peak, due to a wider frequency bandwidth, e.g., two hundred Hz instead of one hundred Hz.

A third method searches for BTT information before-BTT-detection, two five-millisecond predetection intervals each correlator. BTTmode=(1 to 15) and BTT millisecond= 15. All code hypotheses except the one specified by BTT-mode is output to two correlators that are each exactly five-millisecond in duration. The code hypothesis equal to BTTmode is output into eleven correlators. This mode is useful after the code and frequency peaks are resolved, and when searching for any phase navigation data phase reversals.

A fourth method searches for BTT information before-BTT-detection, a ten-millisecond predetection interval is used in each correlator. BTTmode=(1–15) and BTT millisecond=0. Each code hypothesis is output to one correlator except for the code hypothesis specified by BTTmode. This mode is a bit strange, but it does minimize the number of correlators to be read by the software-implemented state machine.

A fifth method maintains BTT with correlator split at epoch of BTT millisecond, BTTmode=(1–15) and BTT millisecond=(1–10). All code hypotheses, except the one specified by BTTmode, are output to two correlators. The split point is the epoch of the millisecond specified by the BTT millisecond. Examining the one millisecond correlator values to observe when the epoch wraps around across a millisecond boundary continues. This provides the best integer millisecond range performance. The tracking logic can switch to a twenty-millisecond predetection interval for maximum weak signal tracking capability with a true twenty millisecond coherent integration period.

A sixth method stops searching the ETT with a correlator split at epoch of BTT millisecond. The BTTmode=0 and BTT millisecond=(1–10), all code hypotheses is output to two correlators where the split point is the epoch of the millisecond specified by BTT millisecond.

This mode is useful when using the accordion mode to zoom-in on peaks with very narrow spacings. The peak is examined for reflected power and to verify that a larger beam is not in the neighborhood.

The tracking logic can switch to a twenty millisecond predetection interval for maximum weak signal tracking capability thanks to a true twenty millisecond coherent integration period.

A numHypotheses variable controls the number of code hypotheses that is executed each playback. This one unsigned byte is the number of correlators used in the mix. This method can be use along with the after-detection BTTmode to create a low power conventional tracking mode.

The numHypotheses is also valid in more than one mode. A narrower range can be searched to save time and power by not searching improbable code hypotheses. For "search" mode, it means how many of the shift delay registers are active. In this case,.the number of active correlators equals numHypotheses.

For "weakMeas" mode, it means how many of the delays on the output of the virtual code generators are active. The number of active correlators is (16*numHypotheses) since the sixteen super virtual code generators are kept active. If numHypotheses is one, the range searched is from starting-CodePhase to startingCodePhase plus thirty sixty-fourths of a chip. For "timeTrack" mode, it means how many of the super virtual code generators are active. The number of correlators which are active is a function of the BTT mode discussed above.

A hypothesisSpacing variable controls the spacing in sixty-fourth of a chips between each code hypothesis. In "search" mode, the spacing is hard-wired to thirty-one sixty-fourths of a chip, so this variable is ignored. In "weakMeas" mode, the correlator spacing is programmed automatically to two sixty-fourths of a chip. So the hypothesisSpacing variable is used mainly in "timeTrack" mode. This is a five-bit unsigned number with a range of 1–32.

A numCodeWindows variable represents the number of times a code hypothesis aperture is shifted to a new phase for a given frequency. To get a full code scan of all possible code hypotheses, this variable will have a value of twelve. Thus, this is a four-bit number with a range of 1–16. It is only used in "search" mode and is ignored in "weakMeas" and also in "timeTrack" mode.

A windowShift variable controls the shift in code phase that must occur between consecutive code windows when numCodeWindows is larger that one. Since the code window is repeated in "search" mode, then the spacing is simply the product of (numHypotheses*31). Such can be easily computed in DSP 114 as a shift left by five and then subtract the original number, e.g., (x*31=x*32−x). A timesTwoMode variable turns on a faster playback capability when needed, as when a larger frequency range must be searched.

A divide mode may be needed to run the clock slower and save operating power in "timeTrack" mode, as when only a few playbacks need to be done. A numRecords variable is the number of consecutive records to run the current set of hypotheses. Any value greater than one means that we are really only searching for one satellite at a time, and thus, we can stay at the current set of hypotheses since we are not switching to other satellites. This is only used in "search" mode. For example, to stay on one satellite for one second. In this case, the variable would have a value of one hundred. This is an unsigned eight-bit number for a range up to 2.55 seconds.

A numFreq variable is the number of frequencies to be searched with the current code hypotheses. This is an unsigned five-bit number with a range of 1–20. It works along with a step size variable to define a frequency search.

A freqStep variable represents the frequency spacing between consecutively search frequencies. The step size should generally be the frequency corresponding to the predetection interval. However, smaller sizes can be used in measurement to fine tune the frequency peak.

A search is started on a smallest frequency side, and continues to a largest frequency. It covers the same range as one which starts in the center and then moves out in both directions. Such method is easier to implement in DSP 114.

For example, suppose we wanted to search ±400 Hz about 1000 Hz. We would make the starting frequency be 650 Hz, and then do eight steps of one hundred Hz to generate the remaining frequencies as shown below. In this case, carrierNcoValue corresponds to 650 Hz, the numFreq=eight, and freqStep are one hundred Hz.

Make the assumption that we do not have double storage for super virtual-carrier NCO variables of offset and delay, and also for virtual code generator variables C1, C2 bit, count, and state. In this way, needing the extra storage is avoided. It means that the DSP is idled when computing them, which means longer setup time, but fewer gates. If it is decided later to speed up and extra gates can be afforded, buffering the precomputed constants as the playback is being computed should be considered.

This current approach is permissible since the ±1000 Hz frequency search requires very little pre-computation at run time. Actually, it only occurs on the first ten-millisecond record. There must be enough resources to do the twenty precomputations in the twenty remaining playback clocks. If not, additional memory may be needed to store the pre-computation results before actually loading them into the destination registers.

The DSP 114 state machine design typically will include defining how a playback clock is selected and controlled. A startplayback variable is used to turn on a playback clock and begin a playback mix. A playbackSamplesToGoCount variable defines the number of remaining samples to be processed in a mix. It is initialized at 2112, plus the number of priming clocks, and is decremented each sample clock that is processed. The processing is completed when the initial value reaches zero. A playbackClockSelector variable selects a playback clock speed. When the value is zero, the master clock is used directly. When the value is one, the master clock is multiplied by two. A playbackClock clock is used to operate all the runtime blocks. A primingComplete signal indicates when a priming is finished and the mix is ready to be started. It is zero when during priming. A playbackComplete signal indicates when a complete 2112 sample mix is finished, and the correlation results are valid in the holding latches. It also is zero when priming, or when any playback has been cleared by the RISC processor 258.

Three possible states can use the same basic state machine. The most typical search is to search all possible codephases over a multiple frequency range. This is done before having user time or position. The state machine will automatically do a ten-millisecond mix at all the codes and frequencies for the defined range.

Each search uses all the playback potential, so other hypotheses must be prevented from being played in parallel. Such would otherwise destroy the continuity of the mix unless the all the states where saved away and restored. This autonomy is needed so that a block can be run full speed without wasting any clocks by waiting to get the microprocessor to supply the next state.

The code search can be specified by defining the starting code, the spacing between each code, and the number of codes to be searched. Based on the 176-correlator model with thirty-one sixty-fourths of a chip spacing, we can search the complete 1023 chips in twelve steps. The command to the DSP 114 is to use all one hundred seventy six hypotheses and do twelve consecutive mixes where the code is shifted by one hundred seventy six sample clocks between each mix to search another portion of the code spectrum. When the first playback is complete, the DSP 114 automatically shifts the code, commences the next shift, and continues the process until the number of searches requested at one frequency is exhausted. A frequency search is performed by repeating the process for a number of frequencies, and stepping variables "numFreq" and "freqStep".

A first search technique uses all the playbacks for one satellite vehicle (SV) at all codephases, ±1000 Hz, and one second. Another technique is to search only a small portion of the code spectrum, such that fewer than all the code hypotheses are used. Only one playback is used for a wide non-coherent scan. This conserves operating power when the approximate code location is known, and there is no need to search further than necessary based on an uncertainty growth model.

The timeTrack mode uses one playback for a narrow coherent scan. Such search aligns an integration boundary with a navigation data-bit phase reversal. The timeTrack mode is a conventional kind, wherein an integration period is synchronized to a locally generated course acquisition (CA) epoch, and not the millisecond. The goal is to avoid integrating past any phase reversal, and requires more correlators at one given phase to save individual integrations in different epochs. For a ten-millisecond predetection interval, eleven correlators are needed to properly save data for ten epochs. The number of code hypotheses needed is reduced to sixteen, since 16*11=176.

The "timeTrack" mode can be contracted and expanded like an accordion. The spacing between each code hypotheses can be adjusted between one sixty-fourth and thirty-two sixty-fourths of a chip. This is enabled by sixteen virtual code generators. The different code hypotheses are simulated from seventeen code generator output delay taps, and a "div3" signal from a code NCO. The "timetrack" mode can select all epochs of a ten-millisecond predetection interval for separate output, or an output cut into two pieces about the epoch.

The high level state machine preferably has three main program-control loops. A recording program-control loop runs only in "search" mode, and commands a search over a large frequency range. It consumes all the available hypothesis space, and others cannot be run in between.

A frequency program-control loop repeats the same code hypotheses at multiple frequencies, and is a fast way to generate multiple frequencies. The processor only intervenes to direct a next search frequency. When combined with the record program-control loop, it provides a very powerful search machine. The code-Doppler NCOs can be independently updated for each frequency.

A codeWindow program-control loop is used to conduct consecutive code searches. A first code window is defined with a table lookup that sets a starting absolute phase, and any subsequent searches generate a code phase by relative shifting of the code.

```
compute priming effect (primingAdjust) for this hypothesis usage and
DSPmode codeGenStrobeCount =2112 - numHypotheses
if (search && numHypotheses=176 && numCodeWindows==12)
fullCodeSearch=1 else 0
  for (recordCnt=0; recordCnt < numRecords; recordCnt++) {
  mixFreq=carrierNcoValue
for (freq=0; freq<numFreq; freq++) {
  if ((recordCnt==0) || (numFreq==0)) /* first record */
  Compute super virtual-carrier NCO data for mixFreq, save it, and load
into super virtual-carrier NCO
Compute code-Doppler NCO step size, save it, and load NCO
  else  /* Not first record */
  Copy super virtual-carrier NCO for this freq from data from memory,
and load into super virtual-carrier NCO
Copy code-Doppler NCO step for this freq from memory, and load
Copy code-Doppler NCO state for this freq from memory and load
  desiredPhase=startingCodephase + codeDopplerShift
  mixPhase=desiredPhase
  run codeDopplerNco to get shift for this record (updates
codeDopplerShift)
  compute virtual code generator data for this code phase and ten-milli-
second predetection interval
  compute hardware phase=desiredPhase + primingAdjust
  init codeNCO and code Generator with hardware phase
  reset carrierNco and dividers and clear correlators
```

```
                                                                    -continued if ((recordCnt==0) || (fullCodeSearch==0)) /* run the priming clocks */
        load primingClocks=codeGenStrobeCount
        set startPlayback=1
      wait till primingComplete=1
      else   /* Not first record or not full search */
        copy code generation state to initialize and set startPlayback=1
      for (codeWindow=0; codeWindow<numCodeWindows;
      codeWindow++) {
        if(playbackClocksToGo>0)&&(playbackClocksToGo=codeGenStrobe-
      Count)
          strobe code generation state and store
        if (playbackComplete==1) /* mix is complete */
          buffer correlators (report mixCodePhase,mixFreq,etc. . ..)
          if (numCodeWindows >1)
            copy code generation state to initialize next phase
            mixPhase=mixPhase - windowShift
               reset carrier NCO and dividers and clear correlators
        } /* End code window playbacks */
      } /* End of one frequency */
      mixFreq +=freqStepSize
      save code-Doppler NCO data for this frequency
      } /* End of one record */
```

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A satellite-navigation system, comprising:

an observer platform for collecting signal observations from orbiting navigation satellites;

a server platform for providing a simplified navigation-satellite constellation almanac, ephemeris, differential correction, and client services;

a navigation platform for passing information between the observer and server platforms; and a polynomial model for reduced data communication volume and reduced computational effort at the navigation platform, and that simultaneously approximates said navigation-satellite constellation almanac, ephemeris, differential correction, and client services;

wherein an aiding data provided by the server platform to the observer platform eliminates all data storage of almanac and ephemeris, and only fixed-point integer arithmetic is used to solve for user position at the navigation platform.

2. The system of claim 1, wherein:

the navigation platform provides for autonomous position solution computations for a limited time after a periodic call for said aiding data from the server platform.

3. The system of claim 1, wherein:

the server platform includes a measurement platform for static observations of a navigation-satellite constellation and that builds a database of measurement errors and satellite data messages.

4. The system of claim 3, wherein:

the server platform includes a health and quality monitor for checking said static observations and preventing an inclusion of incorrect information in said database of measurement errors and satellite data messages.

5. The system of claim 1, further comprising:

a communication link between the server and navigation platforms; and a communication format presented over the communication link that reduces almanac and ephemeris satellite messages at the server platform to simple polynomials that represent a recent satellite position and velocity useful at the navigation platform to compute a current position solution with real-time data from the observation platform.

6. The system of claim 1, further comprising:

a TCP/IP communication link existing at least once between the server and navigation platforms; and an information datapacket format periodically presented at least once over the communication link that reduces almanac and ephemeris satellite messages at the server platform to simple polynomials that represent a recent satellite position and velocity which are useful at the navigation platform to compute a current position solution with real-time data from the observation platform.

7. A satellite-navigation system, comprising:

an observer platform for collecting signal observations from orbiting navigation satellites;

a server platform for providing a simplified navigation-satellite constellation almanac, ephemeris, differential correction, and client services; and a navigation platform for passing information between the observer and server platforms and that provides for autonomous position solution computations for a limited time after a periodic call for an aiding data from the server platform;

a measurement platform included in the server platform for making static observations of a navigation-satellite constellation and that builds a database of measurement errors and satellite data messages;

a health and quality monitor included in the server platform for checking said static observations and preventing an inclusion of incorrect information in said database of measurement errors and satellite data messages;

a TCP/IP communication link existing at least once between the server and navigation platforms; and an information datapacket format periodically presented at least once over the communication link that reduces an almanac and ephemeris satellite message at the server platform to a set of simple polynomials that represent a recent satellite position and velocity, and which are useful at the navigation platform to compute a current position solution with real-time data from the observation platform;

wherein an aiding data with light-weight models provided by the server platform to the observer platform eliminate all data storage of almanac and ephemeris, and permit only fixed-point integer arithmetic to be used to solve for user position at the navigation platform.

8. A satellite-navigation system, comprising:

an observer platform for collecting signal observations from orbiting navigation satellites;

a server platform for providing a simplified navigation-satellite constellation almanac, ephemeris, differential correction, and client services; and a computationally light-weight navigation platform for passing information between the observer and server platforms;

wherein an aiding data provided by the server platform to the observer platform eliminates all data storage of almanac and ephemeris, and only fixed-point integer arithmetic is used to solve for user position at the navigation platform; and wherein, the navigation platform solves user position only to a quantization level, and the server platform differentially corrects such solution and computes quantization as though it is just another error source to arrive at a more precise user position fix.

* * * * *